United States Patent
Murray

(10) Patent No.: US 12,198,105 B2
(45) Date of Patent: Jan. 14, 2025

(54) SMART REMINDERS FOR RESPONDING TO EMAILS

(71) Applicant: Omnissa, LLC, Mountain View, CA (US)

(72) Inventor: James Murray, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 956 days.

(21) Appl. No.: 15/631,266

(22) Filed: Jun. 23, 2017

(65) Prior Publication Data

US 2018/0374056 A1 Dec. 27, 2018

(51) Int. Cl.
G06Q 10/10 (2023.01)
G06Q 10/107 (2023.01)
G06Q 10/1093 (2023.01)

(52) U.S. Cl.
CPC ....... G06Q 10/1093 (2013.01); G06Q 10/107 (2013.01)

(58) Field of Classification Search
CPC .................. G06Q 10/1093; G06Q 10/107
See application file for complete search history.

(56) References Cited

U.S. PATENT DOCUMENTS

| | | | | |
|---|---|---|---|---|
| 7,778,858 B1 * | 8/2010 | Daily | ................... | G06Q 10/107 715/752 |
| 2007/0061423 A1 * | 3/2007 | Accapadi | ................ | H04L 51/00 709/219 |
| 2007/0124371 A1 * | 5/2007 | Desai | ................... | G06Q 10/107 709/204 |
| 2007/0168430 A1 * | 7/2007 | Brun | ..................... | G06Q 10/107 709/206 |
| 2007/0220425 A1 * | 9/2007 | Matulic | ................. | G06F 40/166 715/781 |
| 2007/0244976 A1 * | 10/2007 | Carroll | ................. | G06Q 10/109 709/206 |

(Continued)

FOREIGN PATENT DOCUMENTS

| | | | | |
|---|---|---|---|---|
| CA | 2327409 | 10/1999 | | |
| WO | WO-2014038246 A1 * | 3/2014 | .......... | G06Q 10/107 |

OTHER PUBLICATIONS

Gwizdka, J. S. (2004). Cognitive abilities, interfaces and tasks: Effects on prospective information handling in email (Order No. NQ94431). Available from ProQuest Dissertations and Theses Professional. (305062366). (Year: 2004).*

(Continued)

*Primary Examiner* — Patricia H Munson
*Assistant Examiner* — Nicholas D Bolen
(74) *Attorney, Agent, or Firm* — Kim & Stewart LLP

(57) ABSTRACT

Systems and methods herein provide for improved email efficiency. Based on selections made while drafting an email, a user requesting a response can cause a calendar reminder to be generated and sent to a recipient for automatic entry on that recipient's electronic calendar. When the original sender indicates that an appropriate response has been received, the system can cause the calendar entry to be removed from the recipient's calendar. The system can also generate automatic reminder emails to prompt the recipient to respond to the sender. The sender can access a list of outstanding email responses that are still due from various recipients and modify the associated reminders as desired.

20 Claims, 10 Drawing Sheets

(56) References Cited

U.S. PATENT DOCUMENTS

| | | |
|---|---|---|
| 2009/0287776 A1 | 11/2009 | Corry |
| 2010/0088379 A1 | 4/2010 | Borenstein |
| 2010/0299394 A1* | 11/2010 | Jania ................. H04L 51/14 |
| | | 709/206 |
| 2011/0145101 A1* | 6/2011 | Berger ............... G06F 16/9535 |
| | | 715/764 |
| 2013/0246296 A1 | 9/2013 | Sierra |
| 2016/0042324 A1* | 2/2016 | Johnson ............ G06Q 10/1095 |
| | | 705/7.19 |
| 2017/0124034 A1* | 5/2017 | Upadhyay ............ G06F 40/289 |

OTHER PUBLICATIONS

Office Action dated Jun. 26, 2019 for U.S. Appl. No. 15/631,233.

\* cited by examiner

SMART REMINDERS FOR RESPONDING TO EMAILS

BACKGROUND

Despite increasing options for digital communication, such as instant messaging and social media, email communication remains the leading form of business communication. Worldwide, over 200 billion emails are sent on an average day. Despite the impressive volume, email communication continues to suffer from inefficiencies that have long plagued users.

A major inefficiency of email communication occurs when a user sends an email requesting a response from the email recipient. The user might request, for example, a document or a written explanation from the recipient. In many cases, the recipient does not respond in a timely manner. The burden is then on the user to follow up with the recipient. This can require the user to remember to follow up, either by memory or by manually creating a reminder such as a written note or a calendar entry. If the user remembers to follow up, they may need to search through their sent emails to locate the original request and forward it to the recipient with a reminder note. Even then, additional reminders may be needed in the future if no response is received.

Regardless of the precise manner in which the user chooses to track responses and follow up as needed, the burden still remains on that user. For users that send high volumes of email requests, keeping up with these requests and following up accordingly can become overwhelming. The result is a loss of work productivity, either due to spending too much time managing emails, allowing emails to go unanswered, or a combination of both.

Some solutions provide an option for an email sender to generate a reminder, such as a calendar reminder, for the sender to follow up with an email recipient regarding an outstanding response. However, these solutions fail to solve the core issue of placing the full burden of managing responses on the original sender. For example, the sender would still be required to interact with a calendar reminder, locate the sent email, and send another email requesting a response.

For at least these reasons, a need exists for systems and methods that improve email efficiency. More specifically, a need exists for smart reminders that decrease the burden on the original email sender while providing the recipient with convenient reminders for responding to outstanding emails.

SUMMARY

It is to be understood that both the foregoing general description and the following detailed description are exemplary and explanatory only and are not restrictive of the examples, as claimed.

Systems and methods herein provide for improved email efficiency. An example method can include generating a draft email in an email application, such as BOXER, on a user device. The email application can provide a first option for a sender to enable a recipient response reminder for the email. The application can also provide a second option for the sender to select a date or time period for the reminder. In some examples, the first and second option can be incorporated into a single selection for the sender.

If the first and second options are selected by the sender, the method can include automatically generating a calendar file based on the first and second options. The calendar file can have, for example, an ICS file format so that it can be incorporated into different types of calendar applications. The email application can attach the calendar file to the draft email and send the email and attached calendar file to a recipient. The attached calendar file can be configured to automatically populate an entry on the recipient's calendar based on the first and second options selected by the sender. For example, the calendar file can be set for a date that corresponds with the second option selected by the user. The calendar file can include information identifying the email to which a response was requested. The term "calendar" is used herein to denote any type of electronic calendar, such as the calendar provided with BOXER, MICROSOFT OUTLOOK, or with the APPLE operating systems, for example.

The example method can also include, in response to receiving an indication from the sender that a response has been received, causing the calendar entry on the recipient's calendar to be removed. The indication can be a selection made by the sender in the email application, for example, based on the sender receiving an adequate response from the recipient.

In one example, causing the calendar entry on the recipient's calendar to be removed includes sending a request to a management server at which both the sender and recipient are enrolled. For example, the management server can be part of an enterprise mobility management ("EMM") system. Managed applications can be installed on the enrolled devices, allowing the management server to control particular functionality of the managed applications. In one example, the management server can cause the recipient's calendar to update based on sending a command to a calendar database, managed email server, or the recipient device.

In another example, causing the calendar entry on the recipient's calendar to be removed includes sending a request to the recipient's email server. These examples can also be combined, such as by sending a request to a management server which then provides an instruction to the recipient's email server to remove the calendar entry on the recipient's calendar.

A user's email application can provide a list of all recipient response reminders sent by that user. For example, the user can access a page within the email application that provides a graphical user interface ("GUI") showing a list of the response reminders sent to other users on behalf of that user. The list can include pertinent information such as the time remaining before the response deadline, the recipient of the email, and the subject of the email. The GUI can also include options for performing various actions with respect to the outstanding response reminders, such as deleting, marking as completed, or editing. Editing can include, for example, altering the response deadline or adding information to be displayed in a user's calendar event. Within the list of recipient response reminders in an email application, deleting or marking complete a response reminder can cause the accompanying reminder event in the recipient's calendar to be removed.

When an email recipient responds to an email associated with a response reminder, the original sender can receive a prompt from the email application on their device. For example, the email application can determine that the email is in response to an earlier email associated with a response reminder and then prompt the user with an option to indicate that the response email fully satisfies the user's request. If so, the user can provide an indication accordingly (and cause the calendar reminder to be removed from the original recipient's calendar). If no indication is received, the calendar reminder will remain on the recipient's calendar.

In some examples, the email application can provide various prompts to the user based on parsing the text of sent and received emails. For example, if an email is being sent with text that includes, for example, the phrase "please let me know by the end of the week," then the email application can prompt the user with an option to send a response reminder for the day associated with the end of the business week. In another example, when the user receives a response to an email that generated a response reminder, the email application can parse at least the subject line of the response and prompt the user with an option to remove the calendar reminder associated with the original email.

The email application can also automatically send a reminder email to an email recipient in certain circumstances. For example, if the sender has not indicated that a suitable response has been received, the email application can send a reminder email before the response deadline. The timing of the reminder email can be customized by the sender to allow for different scenarios. For example, when the response might take a high degree of time or effort, the user may choose to set a potential reminder email one day before the response deadline. On the other hand, if the response is a simple yes or no, the user may choose to set the potential reminder email to one hour before the response deadline. The reminder email can be, for example, a forward of the original email with a header insertion that clearly explains when the response is due.

In another example, a system is provided for improving email efficiency. The system can include a user device that includes a processor, a display, and an email application. The processor of the user device can perform various stages for improving email efficiency. For example, it can generate a draft email in the email application and provide first and second options associated the email. The first option can enable a recipient response reminder for the email, while the second option can provide a date or time period for the reminder. In some examples, these options are provided in one combined option, such as a button that, if selected, enables a response reminder for a particular time period.

If the first and second options are selected by the sender, the processor of the user device can automatically generate a calendar file and attach it to the draft email. The processor can then send the email and attached calendar file to a recipient. The calendar file can be configured to automatically populate an entry on the recipient's calendar based on the first and second options selected by the sender. In response to receiving an indication from the sender that a response has been received, the processor can cause the calendar entry on the recipient's calendar to be removed.

In another example, a non-transitory, computer-readable medium is provided. The computer-readable medium includes instructions that, when executed by a processor of a computing device, cause the processor to perform stages for improving email efficiency. This can include, for example, generating a draft email in the email application and provide first and second options associated the email. The first option can enable a recipient response reminder for the email, while the second option can provide a date or time period for the reminder. As mentioned above, these options can be provided in one combined option, such as a button that, if selected, enables a response reminder for a particular time period.

The stages can further include, if the first and second options are selected by the sender, automatically generating a calendar file and attaching it to the draft email. The stages can also include sending the email and attached calendar file to a recipient. The calendar file can be configured to automatically populate an entry on the recipient's calendar based on the first and second options selected by the sender. The stages can also include, in response to receiving an indication from the sender that a response has been received, causing the calendar entry on the recipient's calendar to be removed.

DESCRIPTION OF THE EXAMPLES

Figure 1A:
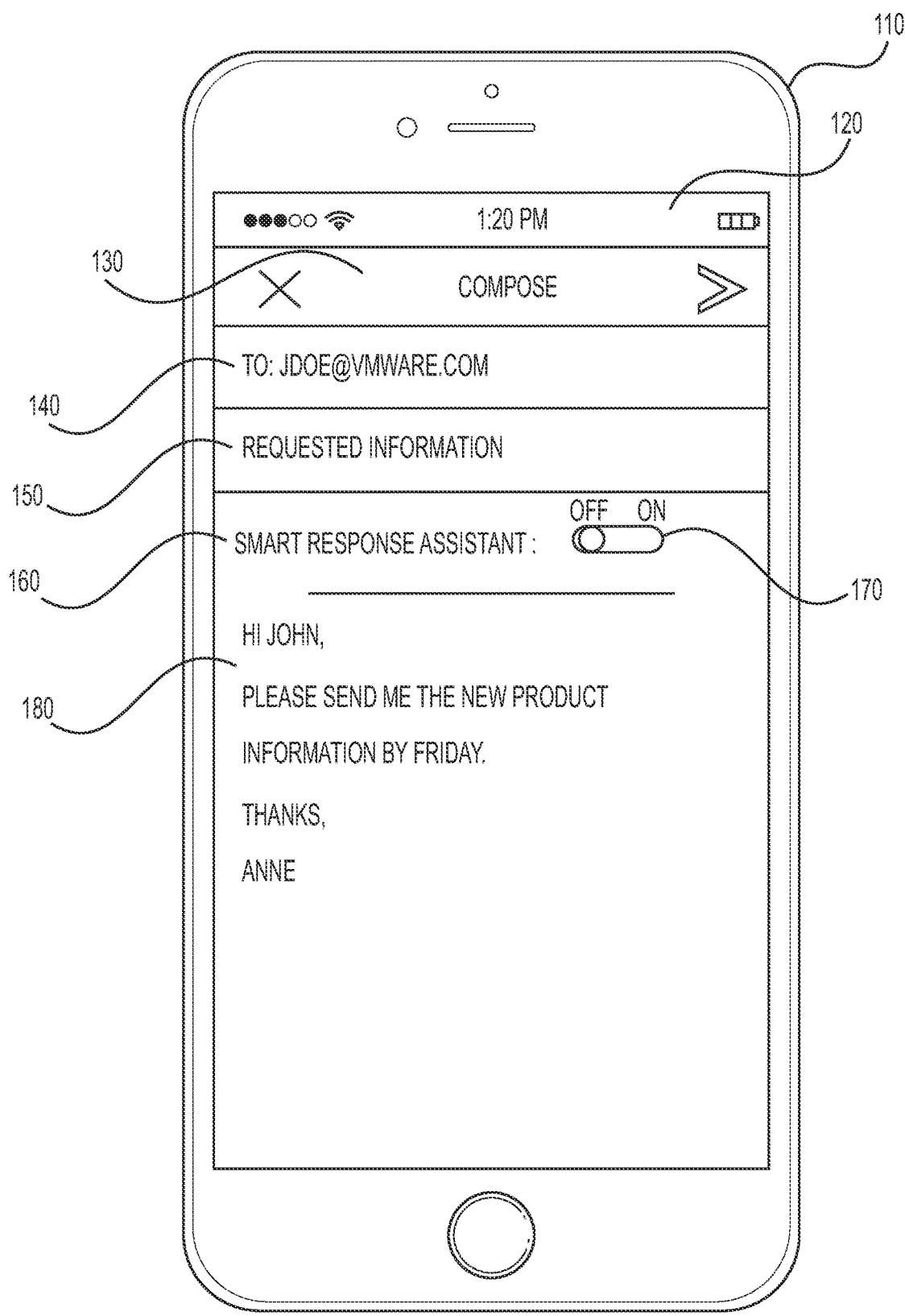
FIG. 1A is an exemplary illustration of an example GUI of an email application on a user device.

Reference will now be made in detail to the present examples, including examples illustrated in the accompanying drawings. Wherever possible, the same reference numbers will be used throughout the drawings to refer to the same or like parts.

Systems and methods herein provide for improved email efficiency. Based on selections made while drafting an email, a user requesting a response can cause a calendar reminder to be generated and sent to a recipient for automatic entry on that recipient's electronic calendar. When the original sender indicates that an appropriate response has been received, the system can cause the calendar entry to be removed from the recipient's calendar. The system can also generate automatic reminder emails to prompt the recipient to respond to the sender. The sender can access a list of outstanding email responses that are still due from various recipients and modify the associated reminders as desired.

FIG. 1 provides an illustration of a user device 110 capable of sending emails. A user device 110 can be any computing device, such as a smartphone, laptop, tablet, personal computer, or workstation. A user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The user device 110 can execute one or more email applications. These applications can be standard email applications installed as part of an operating system, such as APPLE's iOS MAIL application or MICROSOFT OUTLOOK. The applications can also be aftermarket email solutions, such as VMWARE's BOXER. The email applications can be standalone, unmanaged applications, or they can be managed by a management server that enrolls the user device 110. The management server can provide rules, limits, and other configurations for any managed email application. The management server's functionality is discussed in more detail with respect to FIG. 4.

Regardless of whether the email applications are managed or not, they can utilize one or more outgoing email servers based on the email addresses associated with the application. For example, if the user associates an EXCHANGE-based email address with an email application on the user device 110, the user device 110 will access an outgoing email server that is an EXCHANGE server. If the user associates multiple email addresses, using different email servers, with an email application, the user device 110 can associate with the various email servers. When the user attempts to send an email from a particular email address, the user device 110 can select the appropriate outgoing email server based on the address. Although the singular term "server" is used throughout this disclosure, a "server" can include multiple servers, processors, computing devices, and storage mediums.

The email applications can also route email through a secure email gateway ("SEG"). The SEG can be positioned between the user device 110 and an outgoing email server, routing the outgoing emails accordingly. In some examples, the SEG is a part of the outgoing email server.

The email application can be displayed on the user device 110 through a GUI 120. The GUI 120 of FIG. 1 is merely an example, and other GUIs can be used based on the particular email application, type of operating system, or type of user device 110 being utilized. The GUI 120 can include traditional email features, such as a header 130 section at the top providing a title for the current page being shown on the GUI 120. In this example, the header 130 includes the word "Compose" to indicate that the email application is presenting a draft email to be composed by the user. The header 130 can also include a button for deleting the draft email (shown as an "x") and a button for sending the email (shown as an arrow).

The GUI 120 can also include a "TO" field 140 in which the user can include one or more email addresses. This field 140 can be expanded by the user—for example, by pressing the screen at the location of the field 140—to reveal additional fields such as "CC" and "BCC" fields. The GUI 120 further includes a subject field 150 in which the user can include a subject for the email. The body portion 180 of the GUI 120 can be included beneath the previous fields, providing the user with a location to compose the text of their email.

The GUI 120 can also include a reminder prompt 160 for prompting the user with an option to send a response reminder to the email recipient. In this example, the reminder prompt 160 is denoted "Smart Response Assistant," which is merely an example name for the reminder system. The prompt 160 can take any form and be located at any location on the GUI 120. For example, the prompt 160 can be a button that, if selected, activates the reminder system. The prompt 160 can also be a text question, such as "Turn on Reminder?", coupled with buttons for selecting yes or no. While the prompt 160 of FIG. 1A is shown in or above the body 180 of the email, it can be located anywhere. For example, the prompt 160 can be provided as an icon in a corner of the screen that, when selected, provides an option for turning on the reminder system.

The reminder prompt 160 can include a button or slider for activating a reminder for the email being drafted. The button or slider can be considered a GUI element. In this example, the reminder prompt 160 is coupled with a slider 170. The slider 170 can be presented by default or in response to a user selecting the reminder prompt 160. If the slider 170 is set to "ON," a reminder can be activated for this email when the email is sent. Selecting the slider 170 or any option associated with the prompt 160 can be considered a "first option" with respect to setting up a reminder for the email.

Figure 1B:
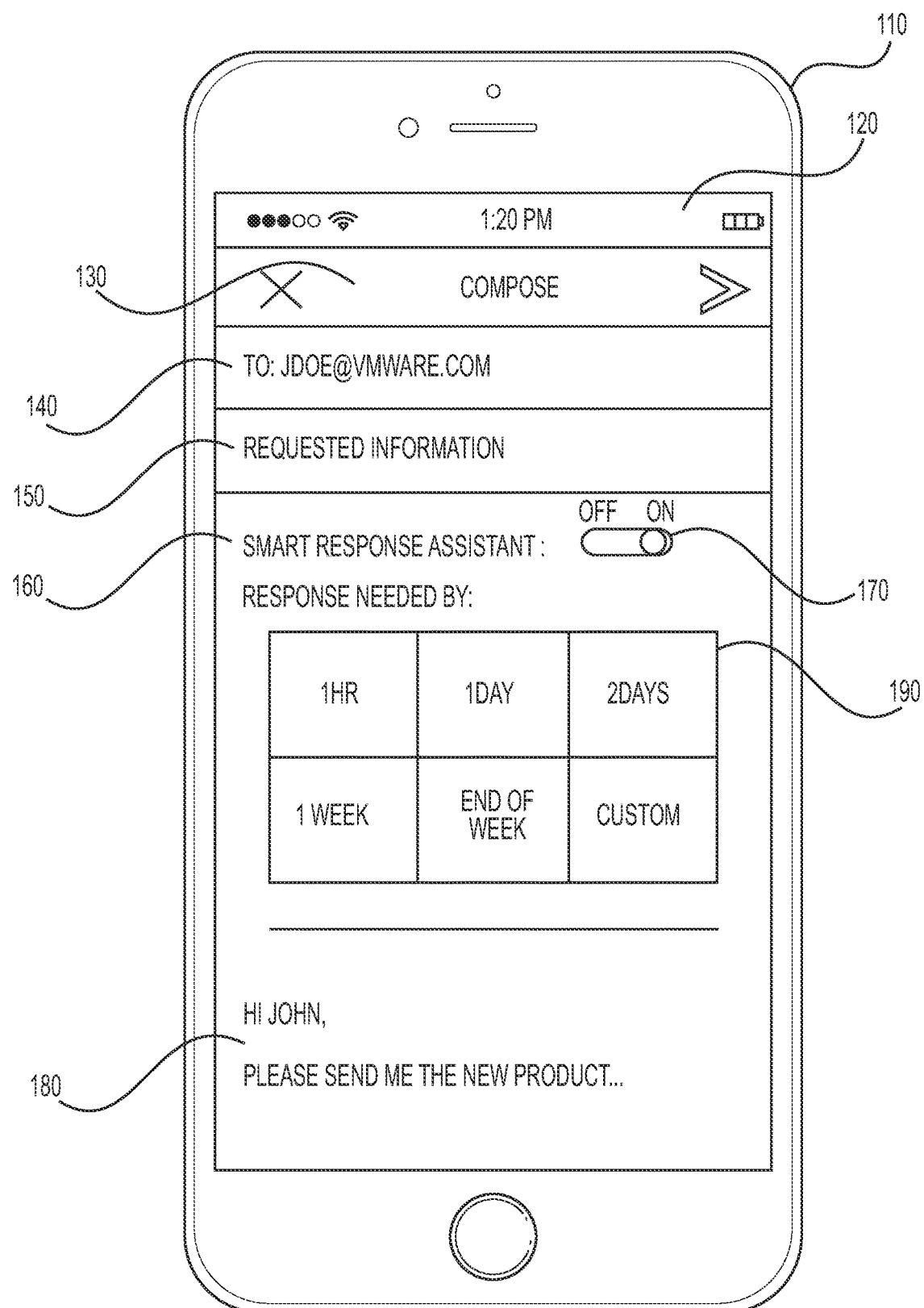
FIG. 1B is an exemplary illustration of an example GUI of an email application on a user device.

A second option can be provided that allows the sending user to select a particular date and time by which a response is needed. In the example of FIG. 1B, a grid 190 is provided. The grid can be considered a second GUI element. The grid 190 can provide various date options that allow the user to select a date and time. The grid 190 can be displayed on the GUI 120 as a result of the user toggling the slider 170 from "off" to "on." It can also be displayed by default, regardless of the status of the slider 170. The email application can provide configurable default settings for the grid 190, such that the user can determine whether the grid 190 appears by default or as a result of the slider 170 being toggled.

In the example shown in FIG. 1B, the grid 190 provides six options: 1 hour, 1 day, 2 days, 1 week, end of week, and custom. These options are merely examples. A user can customize the default grid 190 options to suit their particular needs. For example, a user that consistently requires information within a 10-day window can customize the grid 190 such that the first option is 10 days. A user can also customize the default grid 190 to show a particular number of options, rather than that six options shown in FIG. 1B. For example, the user can set the grid 190 to show one row of three options, two rows of six total options, or three rows of nine total options. The user can also change the number of options per row.

The time periods set forth in the grid 190 options can begin at the time that an email is sent. For example, if the user selects the one-hour option from the grid 190 and then sends the email 20 minutes later, the calendar reminder provided to the email recipient will include a deadline that is one hour from the time that the email was sent. In an example where the selected grid 190 option is a particular date or time, such as "end of week," the calendar reminder provided to the email recipient will not be based on the time of sending the email—instead, it would be set for a time associated with the end of the week, such as the upcoming Friday at 5 P.M.

The grid 190 can also provide a "custom" option that allows a user to select a precise date and time. For example, when the user selects the "custom" option, the device 110 can display a date-selector window on top of the email application GUI 120. The user can utilize the date selector to navigate to a particular date. As part of the process of selecting a custom date, the user can also be prompted to enter a particular time for the selected date. The user can choose not to provide a time, in which case the application can choose a default time such as the close of business for that day.

Figure 1C:
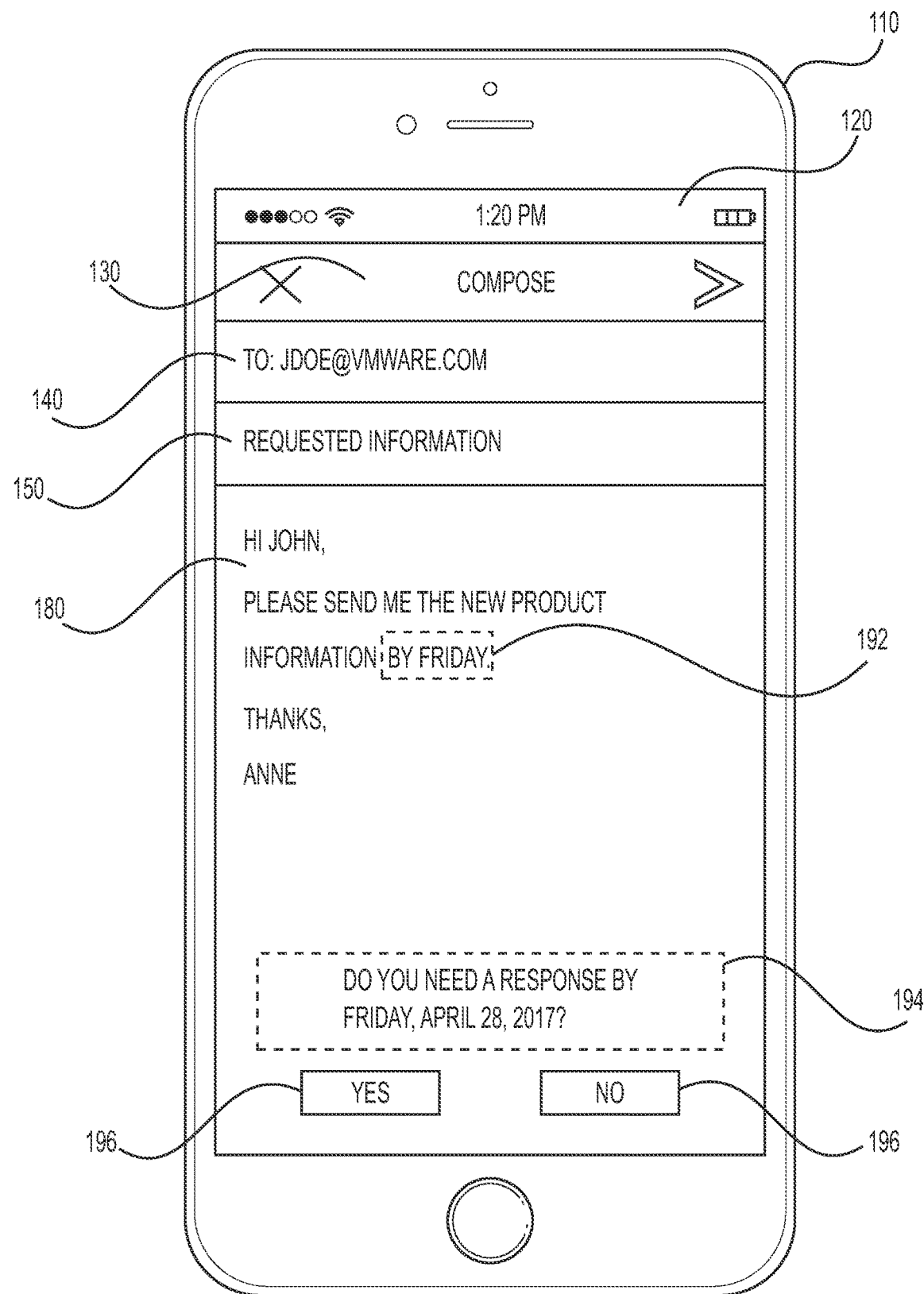
FIG. 1C is an exemplary illustration of an example GUI of an email application on a user device.

Another example option for enabling a response reminder is shown in FIG. 1C. The email application on the device 110 can automatically parse the text of the draft email to determine whether the user might want to enable a response reminder. For example, the email application can search for days of the week, dates, or times in the text of the draft email and, based on the context, infer what the user might want. In the example of FIG. 1C, the email application has parsed the text of the draft email and located the phrase "by Friday." The email application can mark the relevant text with a locator box 192 and display a question box 194. The locator box 192 provides the user with context for how and why the application is displaying the question box 194.

The question box 194 can display a prompt to the user regarding setting a response reminder for the recipient, based on the information identified in the draft email and marked by the locator box 192. The prompt can be a question or other statement. In the example of FIG. 1C, the question box 194 displays a question asking the user if he or she needs a response by Friday, Apr. 28, 2017. In one example, the date is chosen based on the "by Friday" language in the body of the draft email, combined with the fact that the next Friday on the calendar was Apr. 28, 2017. The email application can utilize any contextual information to determine what a user is most likely to need. If, for example, the text of the draft email stated "by next Friday," than the email application could search ahead for the date of the following Friday and use it for the question box 194.

The email application can use any source of information to gain context as to whether a user might want to set up a response reminder for the recipient, and if so, the date and time for which reminder should be scheduled. For example, the email application can access previous response reminders sent to the same recipient from the sending user. In that example, the application can access a storage database or server—such as a management server, email server, SEG, or a local storage—to identify patterns or other historical information that would provide context. If the user has sent previous response reminders to the same recipient, an identifiable pattern may provide insight into whether the user wants to send a reminder. For example, if the user always requests a 24-hour response reminder to a first email recipient, the email application can prompt the user with an option to set a 24-hour response reminder via the question box 194 and response buttons 196. The question box 194 and response buttons 196 can be considered GUI elements.

The email application can use machine learning techniques to identify any relevant patterns, such as patterns with respect to particular email recipients, organizational groups, subject lines or the subject matter of emails, dates and times of sending the initial emails, holidays, weekends, or any other relevant data. The email application can also access the sender's electronic calendar to select times that do not interfere with vacation or other events. Similarly, the application can access the recipient's electronic calendar—for example, by access the management server or the recipient's email server—to determine whether a potential response deadline would conflict with any other event. The application can either avoid recommending a conflicting time in the question box 194 or present the user with a warning of the potential conflict.

Although box 194 is referred to as a "question box," it need not contain a question. For example, the box 194 can include a statement, such as: "a response is due by Friday, Apr. 28, 2017." Regardless of the form of the language in the box 194, a user can respond by selecting a response button 196. In the example of FIG. 1C, two response buttons 196 are shown: yes and no. By selecting yes, the user provides the email application with an indication that the response reminder should be sent to the email recipient for the date and/or time specified in the box 194. If the user selects no, then the email application can provide a follow-up question for the user, such as "Do you need a response by a different date or time?" If the user selects yes to this follow-up question, the application can display a date-selector for the user to select a desired day and time. Selecting a date and/or time can set the response reminder to automatically be sent with the email. In some examples, the user can also be prompted with a subject line or title to be used on the recipient's calendar. Otherwise, the email application can use the senders name, subject line of the email, date of the email, or any combination thereof for the recipient's description of the reminder.

In another example, the response button 196 is an option to cancel the response reminder. If the user does not choose to cancel and then sends the email, the application can initiate the response reminder without further input from the user. For example, the question box 194 can state "A response will be required by Friday, Apr. 28, 2017" and the response buttons 196 can be "edit" and "cancel." If the user sends the email without selecting either response button 196, the response reminder can be set up based on the Apr. 28, 2017 date.

Once a user selects the appropriate options, the email application can create a calendar invitation with the relevant information. In the example of FIG. 1C, selecting the "yes" button 196 can cause the calendar invitation to be created and attached to the email. The calendar invitation can include, for example, a date of Friday, Apr. 28, 2017, and include a title or subject such as "Respond to Anne re: Requested Information." The calendar file can have an .ICS file format, for example, so that it can be incorporated into different types of calendar applications. In some examples, the calendar file is only created and attached after the user attempts to send the email. In yet other examples, the calendar file is not attached to the email but is sent separately, such as by sending a separate message to the recipient's email server. These details are discussed in more depth with respect to FIGS. 3 and 4.

Figure 1D:
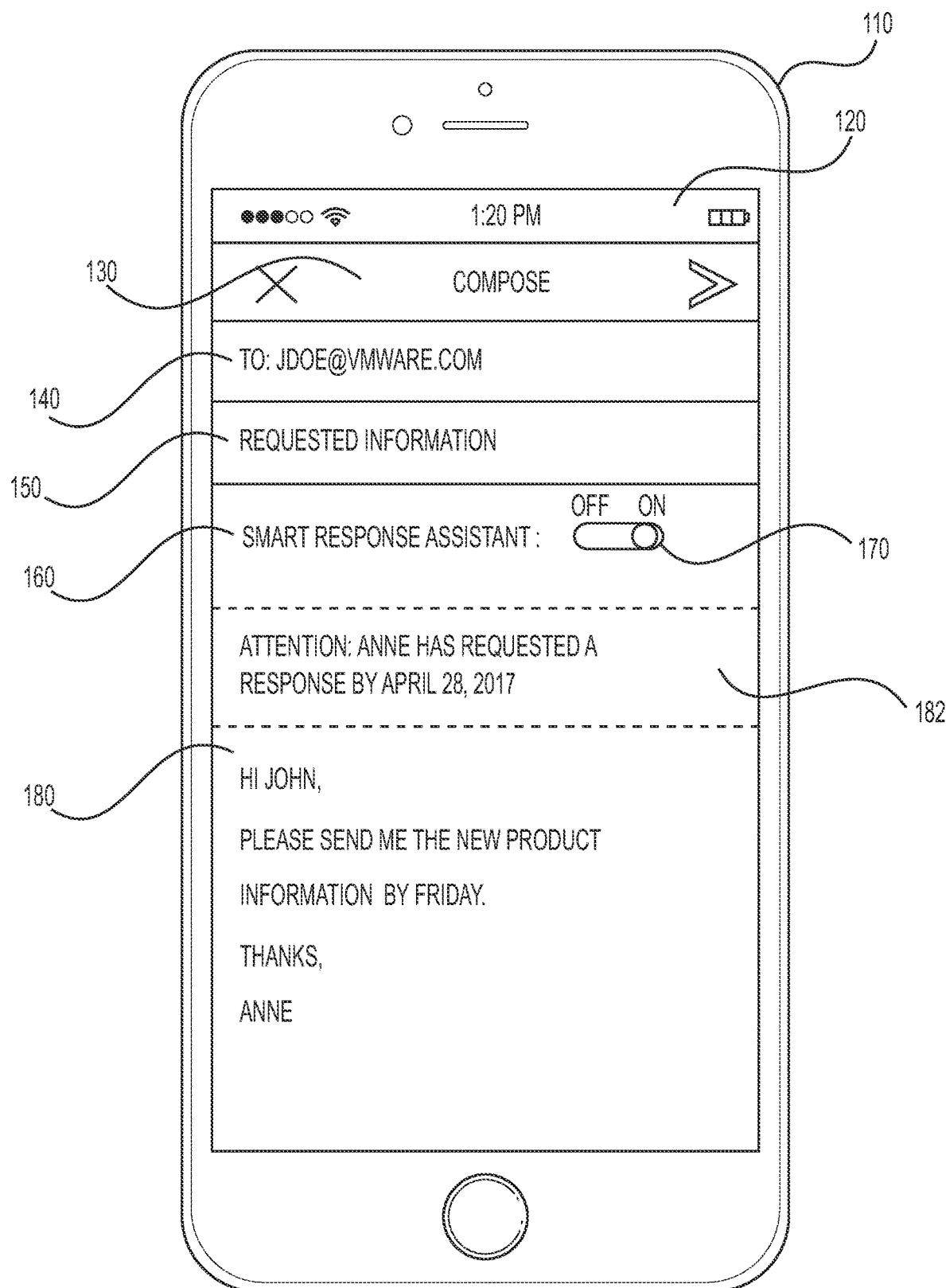
FIG. 1D is an exemplary illustration of an example GUI of an email application on a user device.

In one example, when a response reminder is enabled for an email, the email application can automatically add a section 182 to the body 180 of an email as shown in FIG. 1D. The section 182 can provide information regarding the reminder associated with the email, such as by stating that the sender has requested a response by a certain date. The section 182 can be added to the beginning of the email to increase visibility for the user receiving the email. In some examples, and as shown in FIG. 1D, the section 182 can be added to the draft version of the email, such that the user can edit the section 182 or at least view it. The section 182 can be automatically added to the draft email in response to selecting a reminder prompt 160 by, for example, activating a slider 170 such that it turns from "OFF" to "ON."

In some examples, the email application does not add the section 182 to the draft version of the email, instead adding it after the email is sent. The section 182 can alternatively be added to the email by an email server or gateway rather than the email application. In either case, the section 182 can be added such that it is only seen by the email recipient (or recipients).

Figure 1E:
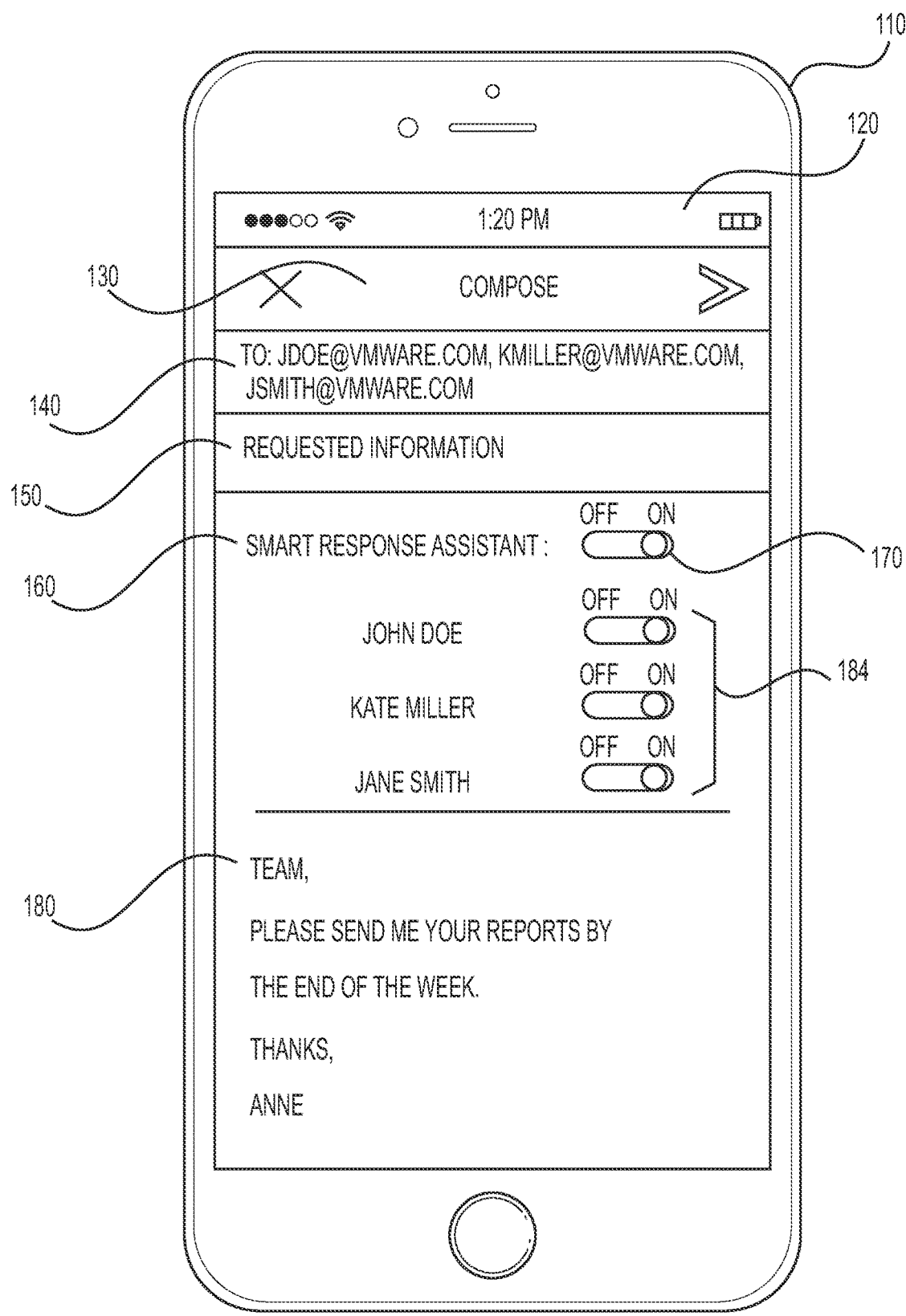
FIG. 1E is an exemplary illustration of an example GUI of an email application on a user device.

When a user wants to send an email to multiple recipients, the email application can provide granular control over which recipients receive response reminders as illustrated further in FIG. 1E. The GUI 120 shown in FIG. 1E depicts a draft email addressed to three different email addresses: jdoe@vmware.com, kmiller@vmware.com, and jsmith@vmware.com. In this example, when the slider 170 associated with the reminder prompt 160 is set to "ON," a set of recipient-specific sliders 184 are displayed on the GUI 120. In this example, three recipient-specific sliders 184 are displayed, each associated with one of the three email recipients listed in the recipient field 140. The user can turn response reminders off or on for each recipient using the sliders 184.

When any of the recipient-specific sliders 184 are set to "ON," a second option can be provided to the sending user that allows the user to select a particular date and time for the response reminder. The second option can be a grid 190, as discussed with respect to FIG. 1B, or a question box 194, as discussed with respect to FIG. 1C. Any other option allowing the user to select a date or time can also be used.

In some examples, the user can select different response times for each recipient associated with the various recipient-specific sliders 184. For example, turning a recipient-specific slider 184 to "ON" can cause a grid 190 to be displayed under that slide 184. The grid 190 can be the grid 190 described with respect to FIG. 1B, or can be a truncated version of that grid 190. In another example, turning a recipient-specific slider 184 to "ON" can cause a button to be displayed next to the slider 184 of the recipient's name, where the button launches a date selector or other mechanism for selecting a particular date and time. In some examples where multiple recipient-specific sliders 184 are presented to the user, a separate slider, button, or toggle can be provided that allows the user to select whether the same date or time should apply to all applicable recipients, or whether the user would like to choose individual dates or times for each applicable recipient.

Figure 1F:
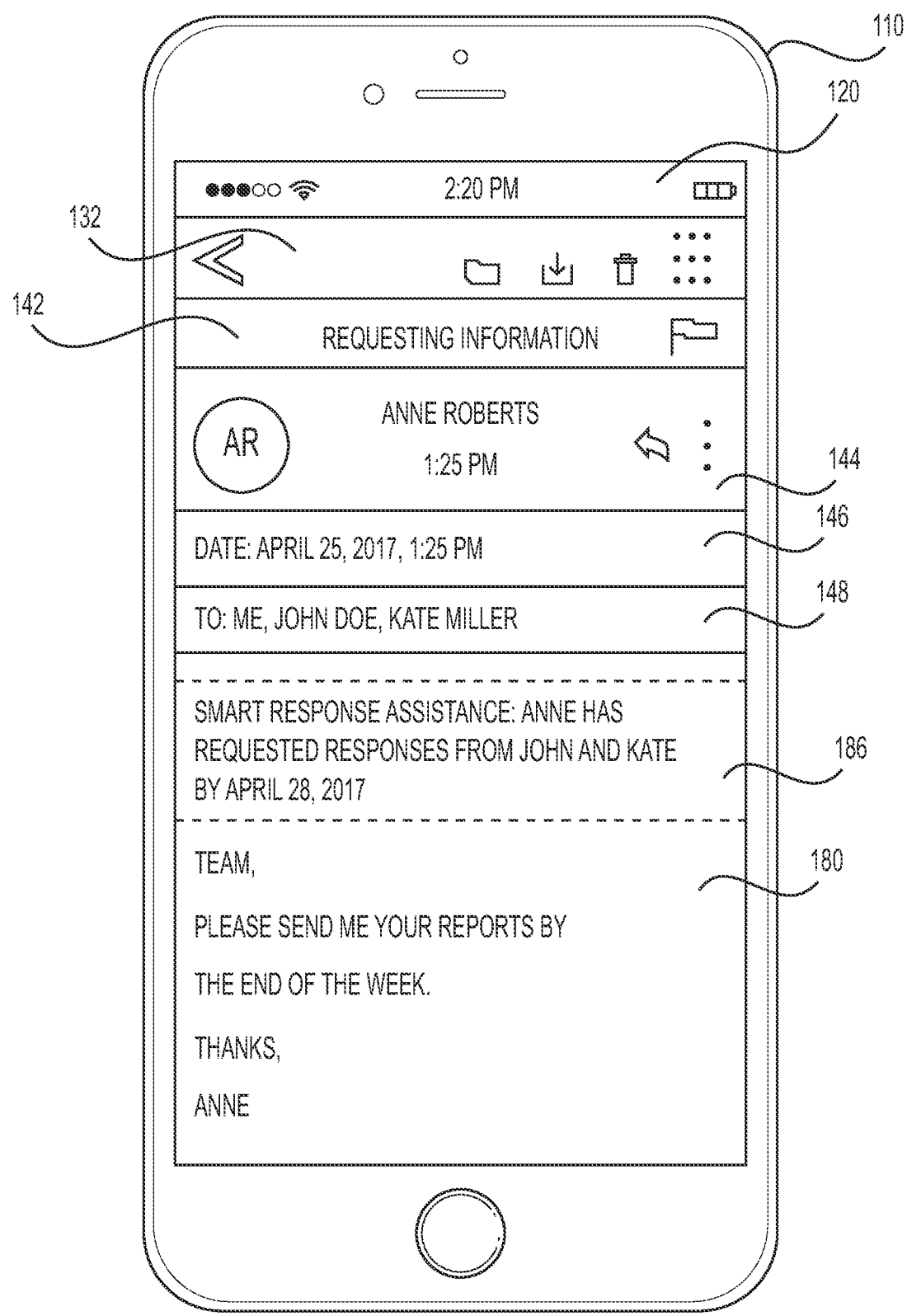
FIG. 1F is an exemplary illustration of an example GUI of an email application on a user device.

FIG. 1F depicts a user device 110 with a GUI 120 displaying an email received from a sending user. The subject line 142 of the GUI 120 displays the subject of the email, while a function bar 132 provides the recipient with options for saving, archiving, deleting, or taking other actions with respect to the email. The sender line 144 includes information about the sender, including their name and the time that the email was sent. The date line 146 includes the full date and time at which the email was sent. The recipient line 148 includes information regarding the recipients of the email.

FIG. 1F also includes a section 186 displaying information regarding a response reminder associated with the email. The information in section 186 can be automatically added to the email by the sender's email application, the recipient's email application, an email server, or a gateway associated with either the sender or recipient (or both). In some examples, such as the example shown in FIG. 1D, the sending user can edit the text within section 182 of the draft email. That edited text can then be displayed to a recipient in section 186 of the received email. In the example of FIG. 1F, the section 186 informs the recipient that the sender (Anne) has requested responses from two of the recipients (John and Kate) by a particular date. This information can be useful to the recipient even in situations, such as here, where the recipient has not been requested to respond.

In some examples, a response reminder can cause an email to be sent to a manager or other individual associated with the recipient to which the response reminder applies. For example, when a response reminder is applied to an email sent to a salesperson, the salesperson's manager can receive a copy of the email with information regarding the response reminder, such as a section 186 providing details about the reminder. Whether a manager or other individual is copied on an email can be determined by organizational groups stored at a management server, for example. Information regarding the organizational groups can also be stored on a user device 110. An administrator can establish hierarchical relationships using the organizational groups, thereby defining who will received copies of emails including response reminders.

When a manager or other individual is copied on an email as a result of a response reminder, the email copy can be sent from the sender's user device 110, such as by adding the manager in a "CC" field. In another example, an email server, gateway, or management server can forward the original email to the manager or generate a copy of the email to send to the manager. In yet another example, the email server, gateway, or management server can generate a new email providing a truncated version of the original email but including the response reminder information, in order to conserve bandwidth.

Figure 2:
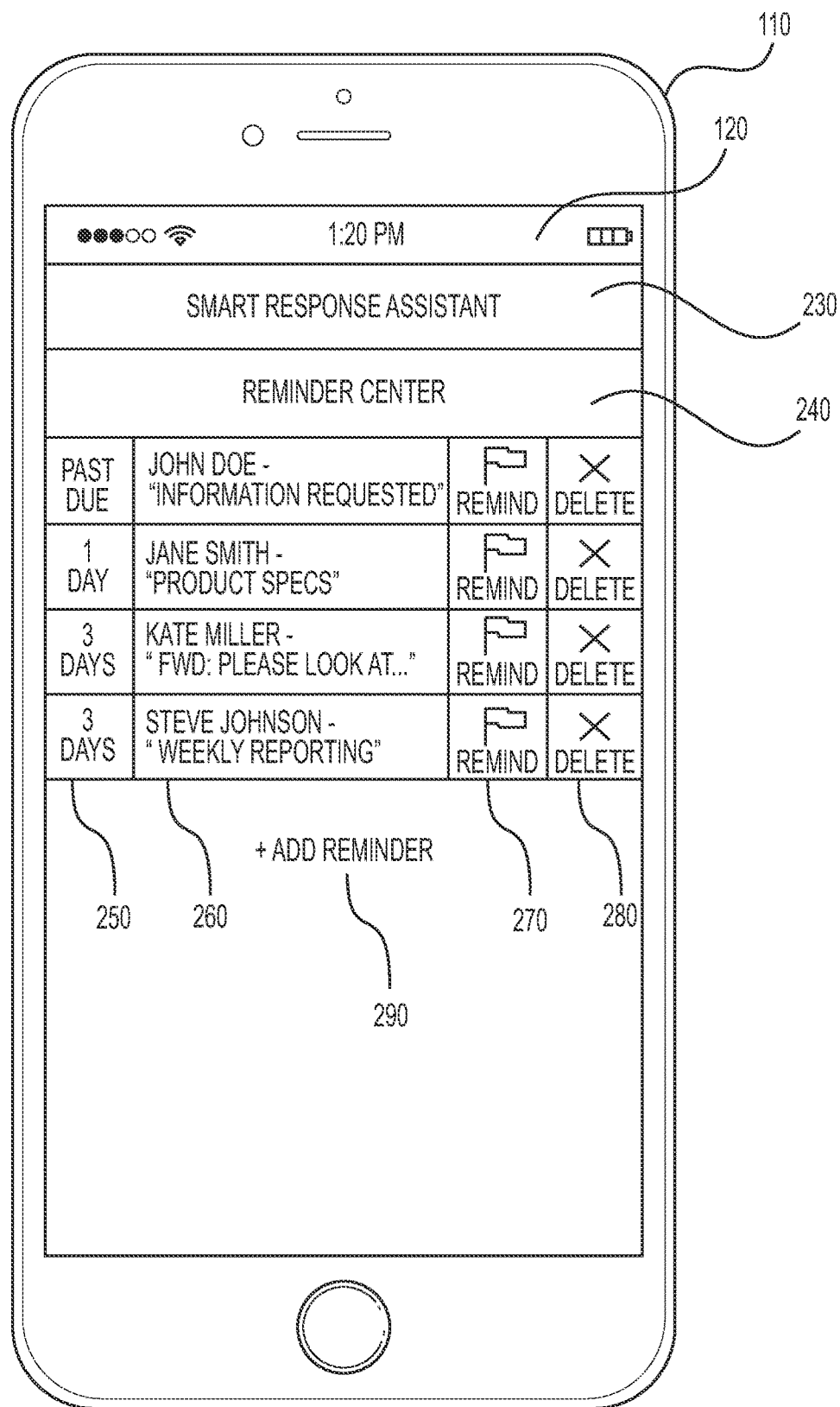
FIG. 2 is an exemplary illustration of an example GUI on a user device.

As shown in FIG. 2, the email application can also provide the user with a Reminder Center 240 for the Smart Response Assistant 230. The Reminder Center 240 can be a page of the email application that collects all the relevant response-reminder information in one location for the benefit of the user. This provides the user with easy access to all outstanding response reminders, allowing the user to easily view, follow up, delete, or revise the reminders without unnecessary searching.

In the example of FIG. 2, the user has four outstanding response reminders that have been sent to various users. The first column 250 includes information regarding the due date of the requested response, including whether the response is overdue. The second column 260 includes the recipient's name and the subject of the email upon which the reminder is based. As can be seen in the drawing, the first reminder to John Doe is past due, while Jane Smith still has one day to respond and the remaining recipients have three days, respectively.

The user can send a reminder by selecting the option in the third column 270. The reminder can be a new email, a forward of the original email, or a forward of the original email with an additional header indicating the due date for responding. In some examples, selecting the "remind" button from column 270 provides the user with options to select the type of reminder email that is sent. In another example, selecting the "remind" button can also provide an option for the user to manually enter text to be included in the reminder email. In still another example, the "remind" button can allow the user to set a reminder to occur automatically rather than requiring user approval at the scheduled reminder time.

The user can delete reminders using the delete buttons provided in the fourth column 280. The option to manually delete reminders can be useful in situations where the email application does not automatically prompt the user to delete the reminder as a result of receiving a response email (as discussed further in FIGS. 3 and 4). For example, this can be useful where the original email recipient provides the requested information in person, over the phone, or by sending an email that is not related to the original email upon which the reminder was based. The Reminder Center can also include an option 290 for adding a new reminder. Selecting this option can launch a new page of the email application that allows the user to select a previously sent email to which the reminder should apply, select a response deadline, and then cause the email application to generate a calendar file to be sent to the recipient and loaded into their electronic calendar.

The user can also view additional details for a response reminder by selecting the reminder from the list shown in the Reminder Center 240. For example, the user can select a reminder by selecting an entry in the second column 260. Doing so can open a page of the email application specific to that reminder, providing options to adjust various items such as the response deadline, subject line of the reminder, or set up a future reminder email in the event that a response is not received. For example, the user can select the entry associated with Kate Miller and elect to send a reminder email in two days, when only one day would remain before the response was due.

Reminders can be generated and stored without associated calendar events. On the sender's side, generating a response reminder (using any of the options described with respect to FIGS. 1A-1F, for example) can cause an instruction or a file to be sent to an email server, gateway, or management server. In some examples, the email server, gateway, or management server can recognize a response reminder as an email is transmitted, and as a result, generate the instruction or file at the email server, gateway, or management server. The instruction or file can be stored and used for providing future reminders or notifications, even where no calendar event is used.

In one example, a user drafting an email can select options for providing a response reminder to a recipient of the email without using a calendar event. The email application on the user's device 110 can generate an instruction or file to be sent—separately from the email or as a part of it—to an email server, gateway, or management server. The email server, gateway, or management server can determine whether a response is received by the deadline. For example, it can query the user device 110 to determine whether the user has removed the reminder from the Reminder Center 240. In another example, the email server, gateway, or management server assumes that a response has not been received unless notification is provided from the user (such as through an email application on the user's device 110). If a response has not been received by a threshold time associated with a relevant deadline, the email server, gateway, or management server can generate a notification and send it to the recipient from which a response is required. For example, a server or gateway can generate an email reminder to the user and optionally attach the original email for which a response is required, send an SMS, MMS, or other message to the user, reminder the user of the required response.

Figure 3:
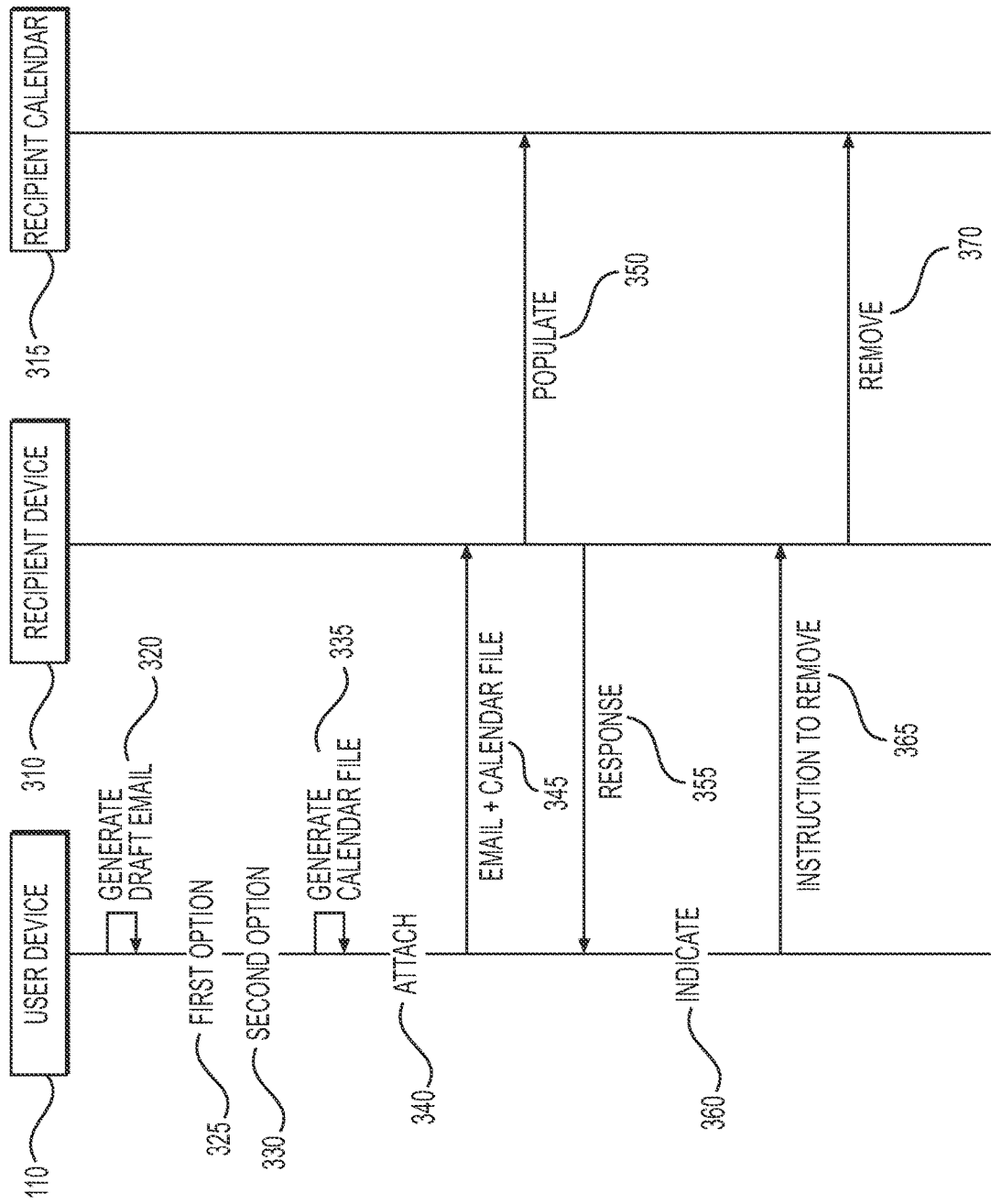
FIG. 3 is an exemplary flow diagram of an example system for improving email efficiency.

A flowchart of an example method is provided in FIG. 3. The flowchart includes a user device 110, such as the devices 110 shown in FIGS. 1A-2, a recipient device 310, and a recipient calendar 315. The recipient device 310 can be any computing device, such as a smartphone, laptop, tablet, personal computer, or workstation, used by the recipient of an email sent by the user device 110. The recipient device 310 can include an email application, but need not use the same email application as the user device 110. The recipient device 310 can include an electronic calendar 315 as part of the email application or as a separate application. The electronic calendar 315 can also be a calendar stored on a different device, such as a laptop or a cloud server, to which the recipient device 310 has access.

Stage 320 of the method includes generating a draft email at the user device 110. This can include, for example, the user accessing the email application on the user device 110 and selecting an option to compose a new email, respond to an email, or forward an email. The email application can be an aftermarket email solution, such as VMWARE's BOXER, or a standard email application installed as part of the operating system on the user device 110.

At stage 325, a first option is provided to the user for enabling a recipient response reminder for the draft email. For example, the email application can provide a prompt 160, such as the one shown and described in FIG. 1A. The prompt 160 can include a slider 170, button, or other selection mechanism allowing the user to indicate that he or she would like a response reminder to be sent to the recipient for that particular email. In some examples, the response reminder can be automatically turned on for a draft email, with the first option being an option to turn off the response reminder. The response reminder can be automatically turned on in situations where the email application determines that a response is needed by a certain date, such as by parsing the text of the draft email.

At stage 330, a second option is provided to the user for selecting a date or time period for the reminder. An example of a second option is shown in FIG. 1B, where the email application has displayed a grid 190 with various date options that allow the user to select a date and time. Another example of a second option is a date-selector window that allows the user to view entire months at once, scroll between months, and select a day from the selected month. The date-selector can also include an input for a specific time. The second option can also be selected automatically by the email application in an example, such as by parsing text to recognize a desired or required response date.

In some examples, the first and second options provided at stages 325 and 330 can be combined and presented as one feature. FIG. 1C provides such an example, where the email application has parsed the text of the draft email and determined that a response might be needed by the upcoming Friday. In response to that determination, the email application presents a box 194 displaying a prompt for the user to set a response reminder for the recipient based on the date inferred by the email application. The user can then select from one or more response buttons 196 to confirm, cancel, or revise the response reminder suggested by the email application. In this example, the prompt of box 194 along with the response buttons 196 combines both the first the second options, as it allows to the user to both enable a response reminder and select a particular date or time for the reminder.

At stage 335 of the method, a calendar file is generated at the user device 110. The calendar file can be an .ICS file or any other file compatible with the recipient calendar 315. In some examples, the email application on the user device 110 can query the recipient device 310, a management server, or an email server associated with the recipient, to determine the format required for a calendar file to work seamlessly with the recipient calendar 315. If the email application cannot determine a correct format for the calendar file, it can generate more than one type of calendar file to ensure that at least one will be usable by the recipient calendar 315.

In some examples, the calendar file can be generated by a device other than the user device 110. For example, an email server or SEG can generate the calendar file based on instructions provided by the user device 110 upon sending the email. In yet another example, a management server can generate the calendar file and send it to the same destination as the email. If the recipient device 310 is enrolled with the management server, the management server can access the recipient calendar 315 directly.

Stage 340 can include attaching the calendar file to the email. In some examples, the calendar file is generated at stage 335 and attached at stage 340 before the email is sent. In other examples, the generation and attachment of the calendar file occurs during the process of sending the email. For example, after a user selects the first and second options and attempts to send the email, the email application can generate the calendar file and attach it to the outgoing email.

In yet another example, the email application send the calendar file in a separate message or email, rather than attaching it to the original outgoing email.

Stage 345 can include sending the email and calendar file to the recipient device 310. As mentioned above, the calendar file can be sent as an attachment to the email or in a separate email, message, or instruction. This stage can include sending the email and calendar file to one or more SEGs and email servers that can route the email from the user device 110 to the recipient device 310.

Stage 350 can include, upon receiving the email and calendar file at the recipient device 310, populating the recipient calendar 315 with an entry corresponding with the calendar file. For example, the calendar file can be configured such that it is automatically added to the recipient's calendar when the email is delivered. In some examples, the recipient can be prompted with an option to accept the calendar event provided by the sender. If the recipient declines the calendar event, the sender will be notified. If the email application is a managed application, then the recipient can be restricted from declining the calendar event. In some examples, the recipient can decline the calendar event received from certain users but not others. For example, a recipient might be able to decline a calendar event from a member of the sales group, but not a calendar event from a member of the executive group. These rules can be set by an administrator through a management server.

Stage 355 can include receiving a response from the recipient device 310 at the user device 110. The response can be an email reply from the recipient, responding to the email transmitted at stage 345. In some examples, the response can be a new email from the recipient, or a forward of a different email. In yet other examples, the response can be a non-email message, such as an SMS, MMS, instant message, or chat message. Depending on the form and content of the response, the email application on the user device 110 can potentially identify that the original recipient has responded. In that case, the user device 110 can ask the user for an indication that an adequate response has been received.

The email application on the user device 110 can use various methods to identify that the original recipient has responded. As explained earlier, the email application can track all outstanding response reminders sent by a user. When an email is received at the user device 110 from any individual for which a response reminder remains outstanding, the user device 110 can analyze the email to determine whether it is likely to be an adequate response. For example, if the incoming email contains a similar subject line to the email sent at stage 345, the email application can infer that it is a response to that email. Taking the example email of FIG. 1A, a response from jdoe@vmware.com with the subject line "Re: Requested Information" would trigger the email application to ask the user whether the response email sufficiently responds to the original email. Any type of threaded email response (for example, forwards and replies) can be a trigger. The email application can then prompt the user with such a question in the body of the email, at a location where the user is likely to have read a sufficient portion of the email before being asked to respond to the prompt.

Even where the response email is not a direct response to the email sent at stage 345, the email application on the user device 110 can use techniques to determine whether the response email contains a suitable response. The email application on the user device 110, or an email server, can parse the text of the response email received at stage 355 and compare the context of the email with the context of the email sent to the recipient device 310 at stage 345. For example, the original email to the recipient device 310 can ask for the product specs for a particular product number, such as "Product No. ABC123." Upon receiving a response email from the recipient, the email application on the user device 110 can parse the text of the response, as well as any attachments, to look for key words such as "ABC123." If the key word is found, the email application can prompt the user to provide an indication that a suitable response was received.

At stage 360, the user can provide an indication that an adequate response was received. The indication can be provided in a variety of ways. In one example, the email application determines that a response was received from the recipient and prompts the user with a question, such as "Would you like to remove the response reminder for your email titled 'Requesting Information' sent yesterday at 2 P.M.?" The question can include a yes and a no button for the user to select. If the user selects "yes," the email application can take actions to remove the response reminder from the recipient calendar 315.

At stage 365, the user device 110 can send an instruction to the recipient device 310 to remove the calendar event from the recipient calendar 315. The instruction need not go directly from the user device 110 to the recipient device 310, however. In some examples, the instruction is sent from the user device 110 to an email server associated with the recipient device 310. In another example, the instruction is sent to a management server (as discussed with respect to FIG. 4).

Upon receiving an instruction to remove the calendar event, the recipient device 310 can cause the calendar event to be removed from the recipient calendar 315 at stage 370. The calendar event can be removed silently without user interaction. In some examples, the email server associated with the recipient device 310 can act on behalf of the recipient device 310 and remove the calendar event from the recipient calendar 315. When the calendar event has been removed from the recipient calendar 315, the email application on the user device 110 can be updated. For example, the associated reminder can be removed from the Reminder Center 240 of FIG. 2. The email application can also provide a notification on the user device 110, such as a banner notification on the home screen of the user device 110 or a pop-up bubble within the application.

Figure 4:
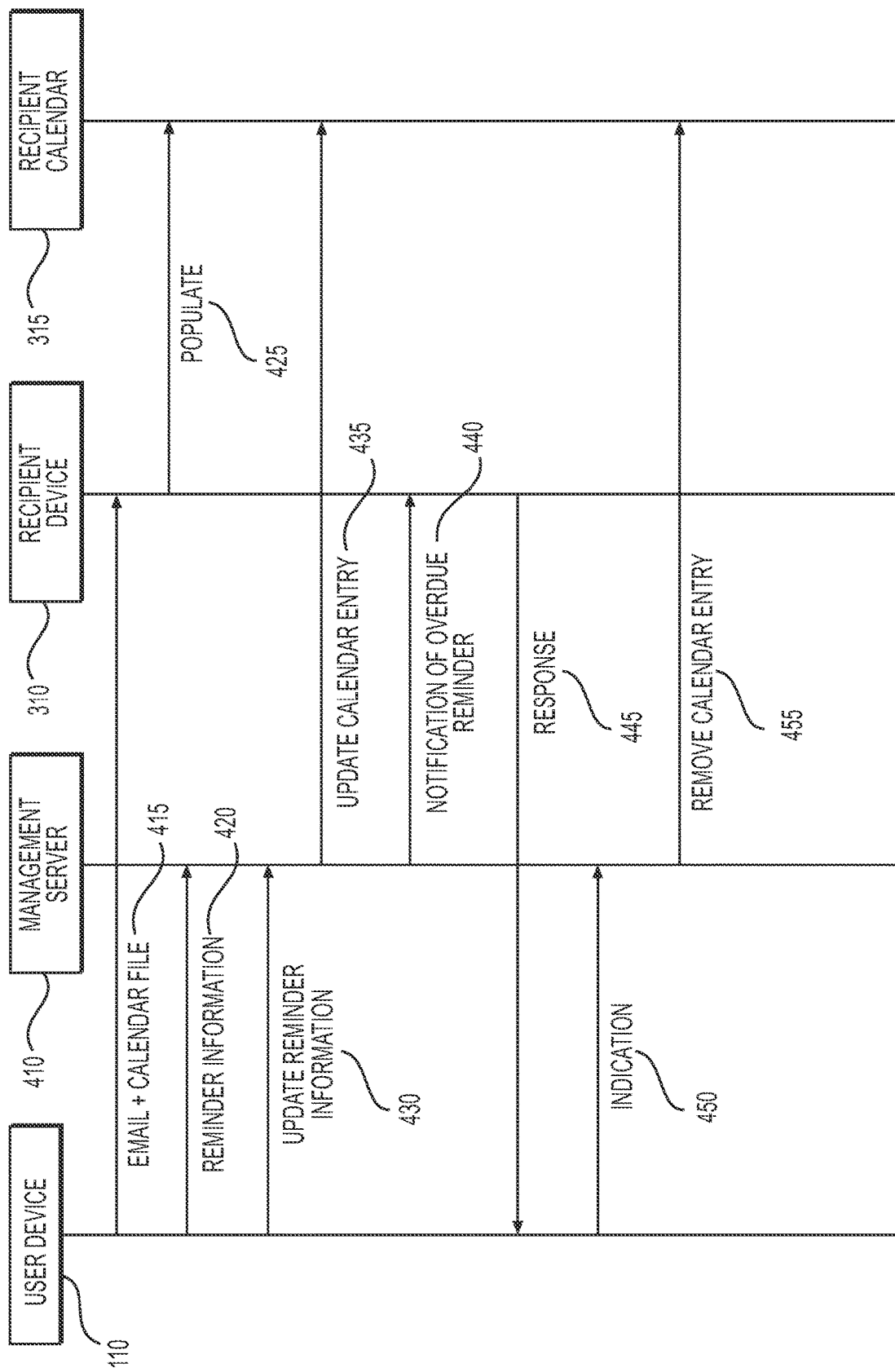
FIG. 4 is an exemplary flow diagram of an example system for improving email efficiency.

FIG. 4 provides an example diagram of a method similar to the method of FIG. 3, with the addition of a management server 410 and its related functionality. The management server 410 can control managed applications installed on the user device 110 or recipient device 310, such as managed email applications. An administrator can configure functionality and access restrictions for particular users or groups of users at the management server 410. Then the management server 410 can control file access and device functionality of the user device 110 or recipient device 310 accordingly. For example, the management server 410 can turn off functionality at a device, such as printing, emailing, or Internet access. Additionally, a content application on a first user device can be configured to allow access to a first repository but not a second, whereas a second user device can be configured to access the second repository. These access and functionality settings can be stored in profiles that the management server 410 links to users or user devices.

The management server 410 can control managed applications through interaction with a management agent that can execute on the user device 110. The management agent can be an application or part of an operating system, and can enable or disable functionality on the user device 110. The management agent can be installed when the user device 110 enrolls with the management server 410, in one example. The management server 410 can be part of an enterprise mobility management ("EMM") system. The management server 410 can dictate which managed applications are installed, based, for example, on which user group a user belongs to. Similarly, specific functionality within the managed applications can be enabled or disabled by the management server 410, and can vary per user or user group.

The management server 410 can communicate with the user device 110, recipient device 310, and any respective email servers or SEGs. This communication can take place over a network using one or more modulators, demodulators, multiplexers, demultiplexers, network communication devices, wireless devices, antennas, modems, and any other type of device configured to enable data communication through a communication network. The network over which files are sent and retrieved can be an enterprise network in one example. The network can include the Internet, a local area network, or any other suitable communication platform. The components can communicate over the network using one or more modulators, demodulators, multiplexers, demultiplexers, network communication devices, wireless devices, antennas, modems, and any other type of device configured to enable data communication through a communication network.

The management server 410 can also monitor the use of response reminders and implement controls on certain users where necessary. For example, the management server 410 can enforce a rule that prevents a user from a first user group from sending a response reminder to a user in a second user group. Such a rule can be used to prevent a member of a sales group or accounting group from sending a response reminder to a member of the executive group, but allow the members of the executive group to send response reminders to any other group. The management server 410 can also implement limits on the frequency of using response reminders to prevent abuse. For example, if a user sends more than 10 response reminders a day or sends response reminders on more than 50% of their outgoing emails, the management server 410 can disable the response-reminder feature for that user, either temporarily or permanently. The management server 410 can also receive feedback from users that receive response reminders, allowing those users to report other users that abuse the feature. An administrator can customize various rules and features at a console for implementation by the management server 410.

Turning back to FIG. 4, the stages shown occur after the user device generates a draft email, provides first and second options for the user to select with respect to a response reminder, and generates and attaches an electronic calendar file. These stages are discussed above with reference to stages 320, 325, 330, and 340 of FIG. 3.

At stage 415 the user device 110 can send an email and calendar file to the recipient device 310, either directly or by routing through one or more email servers and SEGs. At stage 420, the user device 110 can send reminder information to the management server 410. Stage 420 can take place simultaneously, or in advance of, stage 415. The reminder information can include any relevant information about a response reminder requested by a user. For example, it can identify the particular email, recipient, and the details of the first and second options selected by the user with respect to the details of the response reminder.

In some examples, the email and calendar file are sent separately or from different locations. For example, the management server 410 can receive the reminder information from the user device 110 regarding a response reminder that a user wishes to include with an outgoing email. Instead of the user device 110 generating the calendar file, the management server 410 can generate the calendar file when it detects that the email has been sent. The management server 410 can transmit the calendar file to the recipient device 310 or to an email server associated with the recipient device 310.

Stage 425 can include populating the recipient calendar 315 with a calendar event associated with the calendar file sent at stage 415. Populating the recipient calendar 315 with the calendar event can be performed by the recipient device 310, as shown in FIG. 4, or by an email server, SEG, or management server 410. In the example provided above where the management server 410 creates the calendar file, the management server 410 can also communicate with the email server associated with the recipient device 310 to populate the recipient calendar 315 with the calendar event.

Stage 430 can include updating the reminder information and providing the updated information to the management server 410. This stage is optional, as the sending user may not need to update the reminder. In some cases, however, the user may want to change the deadline for responding or alter some other information associated with a response reminder. For example, the user can access the Reminder Center 240 shown in FIG. 2, select the relevant reminder entry, and change the deadline to provide the recipient with less or more time to respond. Upon doing so, the email application on the user device 110 can send updated reminder information to the management server 410.

The management server 410 can update the calendar entry on the recipient calendar 315 at stage 435. For example, the management server 410 can send an instruction to an email server associated with the recipient device 310 with instructions to update the calendar entry. The management server 410 can thereby update the calendar entry without needing to send a new email or otherwise inconvenience the sender or recipient.

The management server 410 can also track deadlines and provide additional reminders as necessary. For example, if a recipient misses or ignores a calendar reminder, the management server 410 can follow up at stage 440 by sending a notification of an overdue response. The notification can be provided by the management server 410 in a variety of forms. In one example, the management server 410 sends a notification instruction to a managed email application on the recipient device 310, where the notification instruction causes the application to generate a notification on the recipient device 310. The notification can include information about the email to which a response is still required. The management server 410 can also send a new email to the recipient device 310 with information about the missed deadline, or even populate a new calendar event in the recipient calendar 315 that includes a more urgent title or other urgent markings.

At stage 445, a response can be received at the user device 110 from the recipient device 310. The response can be an email reply from the recipient, responding to the email transmitted at stage 415. In some examples, the response can be a new email from the recipient, or a forward of a different email. In yet other examples, the response can be a non-email message, such as an SMS, MMS, instant message, or chat message. Depending on the form and content of the response, the email application on the user device 110 can potentially identify that the original recipient has responded.

In that case, the user device 110 can ask the user for an indication that an adequate response has been received.

As explained with respect to FIG. 3, the email application on the user device 110 can use various methods to identify that the original recipient has responded. The email application can analyze an email received from a recipient associated with a response reminder to determine if the email is likely to be an adequate response. For example, the email application can consider the subject line of the email and whether it includes the subject of the original email. In another example, the email application can parse the text of the response email and compare it to other context, such as the text of the original email. In some examples, the management server 410 can perform some or all of the analysis of a response email to determine whether it is likely to be a response that satisfies the response reminder. For example, the management server 410 can gather information from the response email and apply various machine-learning algorithms, taking advantage of the increased storage capacity and processing power of a server, or set of servers, relative to the capabilities of the user device 110.

At stage 450, the user can provide an indication that an adequate response was received. The indication can be provided in a variety of ways. For example, the email application can provide a prompt to the user, such as a question asking the user whether the response from stage 445 satisfies the requirements underlying the response reminder associated with the original email to the recipient. The user can respond by selecting a yes or no button, in an example. In another example, the indication at stage 450 can be provided by the user through the Reminder Center 240 detailed in FIG. 2. The indication can be provided to the management server 410 from the user device 110.

Upon receiving the indication from the user device 110, the management server 410 can perform steps for removing the calendar entry on the recipient calendar 315 at stage 455. For example, the management server 410 can send an instruction to an email server associated with the recipient device 310, instructing the email server to remove the calendar entry. The management server 410 can send a confirmation to the user device 110 if desired, informing the user that the reminder has been deleted.

Figure 5:
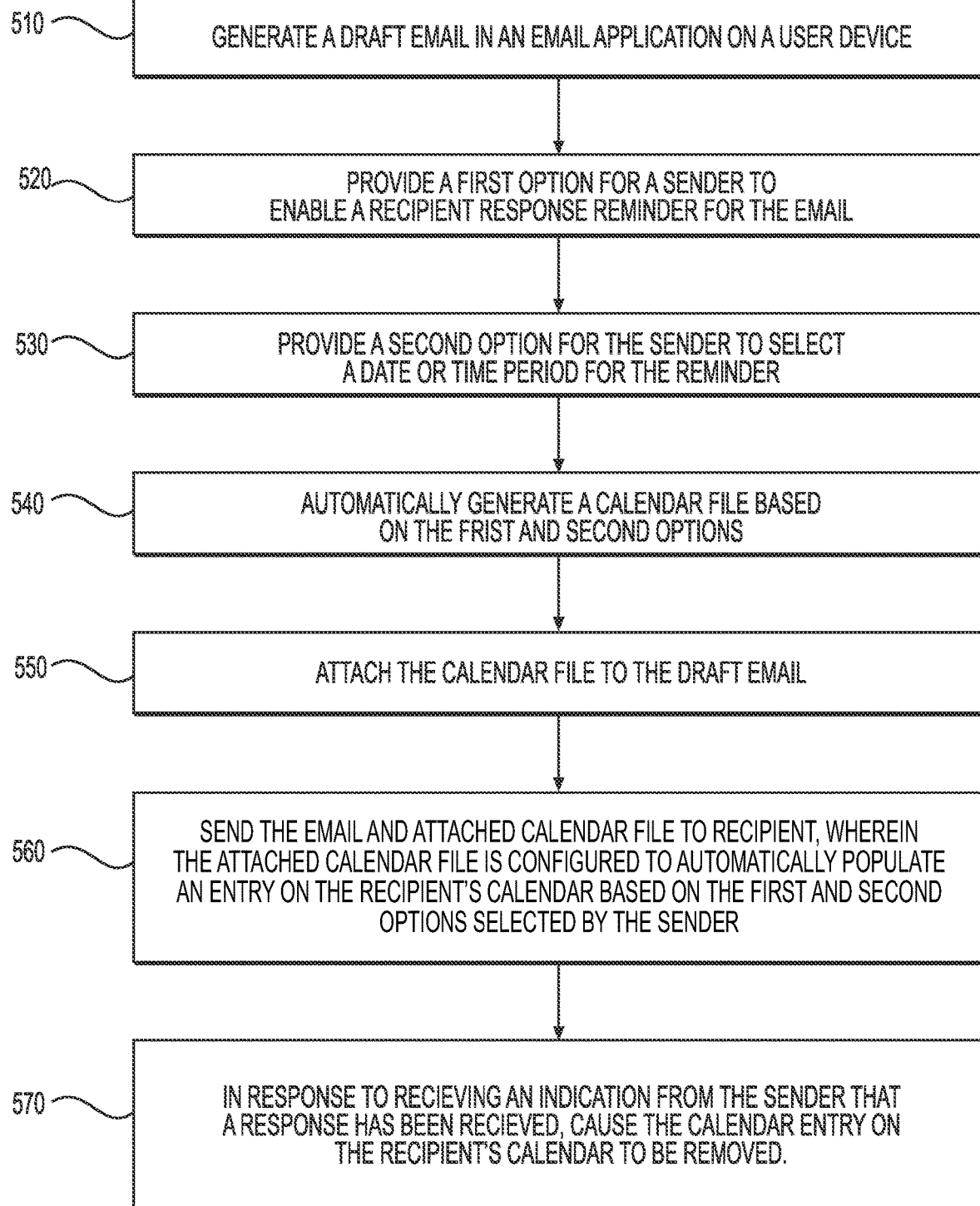
FIG. 5 is an exemplary flowchart of an example method for improving email efficiency.

FIG. 5 provides a flowchart of an example method for improving email efficiency. The method can be carried out by a user device 110, management server 410, email server, SEG, or a combination thereof. Stage 510 can include generating a draft email in an email application the user device 110. This can include, for example, having the user access the email application on the user device 110 and select an option to compose a new email, respond to an email, or forward an email. The email application can an aftermarket email solution, such as VMWARE's BOXER, or a standard email application installed as part of the operating system on the user device 110.

At stage 520, a first option is provided for a sender to enable a recipient response reminder for the email. For example, the email application can provide a prompt 160 such as the one shown and described in FIG. 1A. The prompt 160 can include a selection mechanism allowing the user to indicate that he or she would like a response reminder to be sent to the recipient for that particular email. In some examples, the response reminder can be automatically turned on for a draft email, with the first option being an option to turn off the response reminder. The response reminder can be automatically turned on in situations where the email application determines that a response is needed by a certain date, such as by parsing the text of the draft email.

At stage 530, a second option is provided for the sender to select a date or time period for the reminder enabled at stage 520. An example of a second option is the grid 190 of FIG. 1B, which provides various dates or times for the user to select from. Yet another example of a second option is a date selector that provides that ability to select a particular date and optionally input a specific time. In some examples, stages 520 and 530 can be performed simultaneously or with a single action. An example of this is explained with respect to FIG. 1C, where the email application has determined that a response might be needed based on the text of the draft email. The email application can prompt the user with a combined option to set a response reminder for a particular date, providing both the first and second option in one selection.

At stage 540, a calendar file is automatically generated based on the first and second options. This stage can be performed at the user device 110 or elsewhere, such as at a management server 410 or email server. The calendar file can be an .ICS file or any other file compatible with the recipient calendar 315. At stage 550, the calendar file can be attached to the draft email. In some alternate examples, the calendar file is sent separately rather than being attached to the draft email. For example, a management server 410 can generate and deliver a calendar file based on information received from the user device 110 regarding an outgoing email and related response reminder.

Stage 560 can include sending the email and calendar file to a recipient. The calendar file can be configured to automatically populate an entry on the recipient's calendar based on the first and second options selected by the sender. For example, the calendar entry would match the date and time selected by the user. In some examples, the calendar entry is shown on the recipient's calendar in a preliminary fashion, requiring the recipient to accept or deny the event before fully entering it into the calendar.

Stage 570 can include, in response to receiving an indication from the sender that a response has been received, causing the calendar entry on the recipient's calendar to be removed. The indication can be provided in a variety of ways. In one example, the email application determines that a response was received from the recipient and prompts the user with a question asking whether the user would like to remove the response reminder for the associated email. If the user agrees, the email application can take actions to remove the response reminder from the recipient calendar. For example, the user device can send an instruction to the recipient device 310 to remove the calendar event from the recipient calendar 315. In some examples, the instruction is sent from the user device 110 to an email server associated with the recipient device 310. In other examples, the instruction is sent to a management server 410 which removes the calendar event from the recipient calendar 315. The management server 410 can remove the event by, for example, sending an instruction to an email server associated with the recipient calendar 315.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A graphical user interface (GUI) displayed within an application executing on a user device having a hardware-based processor, the GUI comprising:
   a recipient section of a draft email, having a field in which a user can enter at least one recipient;
   a subject section of the draft email, having a field in which the user can enter a subject;
   a body section of the draft email, having a field in which the user can enter text; and
   a first GUI element of the draft email that, when selected by the user, causes a first recipient GUI element and a second recipient GUI element to display, the first and second recipient GUI elements being specific to first and second individual recipients listed in the recipient section of the draft email, wherein selection of the first recipient GUI element causes a first date GUI element to be displayed in the draft email,
   wherein selection of the second recipient GUI element causes a second date GUI element to be displayed in the draft email,
   wherein the first and second date GUI elements suggest deadlines that the user can accept or decline, the suggested deadlines being based on detected content within the body section of the GUI,
   wherein the user can select first and second deadlines for the first and second recipients using the first and second date GUI elements, respectively, the first and second deadlines being different from one another, and
   wherein selection of the first and second deadlines causes:
      a first calendar file to be automatically generated and attached to the draft email when sent to the first recipient, the first calendar file setting the first deadline for responding to the email, and
      a second calendar file to be automatically generated and attached to the draft email when sent to the second recipient, the second calendar file setting the second deadline for responding to the email.

2. The GUI of claim 1, wherein the first date GUI element comprises a grid with multiple rows and columns of potential deadlines corresponding to a plurality of response times.

3. The GUI of claim 2, wherein each of the plurality of response times comprises time periods, dates, or both.

4. The GUI of claim 1, further comprising a header section, wherein the header section is automatically added to the body section of the draft email based on the selection of the first GUI element.

5. The GUI of claim 1, wherein each, or both, of the first and second recipient GUI elements can be selected independently of the other.

6. A non-transitory, computer-readable medium comprising instructions executed by at least one processor to display an interactive graphical user interface (GUI) on a device, the GUI comprising:
   a recipient section of a draft email, having a field in which a user can enter at least one recipient;
   a subject section of the draft email, having a field in which the user can enter a subject;
   a body section of the draft email, having a field in which the user can enter text;
   a first GUI element of the draft email that, when selected by the user, causes a first recipient GUI element and a second recipient GUI element to display, the first and second recipient GUI elements corresponding to first and second recipients listed in the recipient section of the draft email, wherein selection of at least one of the first and second recipient GUI elements causes a calendar file to be automatically generated and attached to the draft email when sent to the corresponding at least one recipient, the calendar file setting a deadline for responding to the email; and
   a header section that identifies the first and second recipients corresponding to the first and second recipient GUI elements and identifies the corresponding deadline for responding to the email, wherein the header section is automatically added to the body section of the draft email based on the selection of the first and second recipient GUI elements.

7. The non-transitory, computer-readable medium of claim 6, the GUI further comprising a second GUI element that is displayed in response to selection of the first GUI element, wherein the second GUI element comprises a plurality response times, and wherein selecting one of the plurality of response times causes the calendar file to set the deadline in accordance with the selected response time.

8. The non-transitory, computer-readable medium of claim 7, wherein each of the plurality of response times comprises time periods, dates, or both.

9. The non-transitory, computer-readable medium of claim 6, wherein the deadline set by the calendar file is based on detected content within the body section of the GUI.

10. The non-transitory, computer-readable medium of claim 6, wherein each or both of the first and second recipient GUI elements can be selected independently of the other.

11. A computing device comprising:
   a processor;
   a display;
   a GUI presented on the display, the GUI further comprising:
      a recipient section of a draft email, having a field in which a user can enter at least one recipient;
      a subject section of the draft email, having a field in which the user can enter a subject;
      a body section of the draft email, having a field in which the user can enter text; and
      a first GUI element of the draft email that, when selected by a first selection action of the user, causes a first recipient GUI element and a second recipient GUI element to display simultaneously, the first and second recipient GUI elements specifically identifying first and second recipients listed in the recipient section of the draft email,
      wherein the first and second recipient GUI elements are independently selectable by a second selection of the user,
      wherein the first and second recipient GUI elements both remain visible and available for further selection on the GUI after the second selection by the user; and
      wherein selection of the first and second recipient GUI elements causes a calendar file to be automatically generated and attached to the draft email when sent to each recipient, the calendar file setting a deadline for responding to the email.

12. The computing device of claim 11, wherein the GUI further comprises a second GUI element that is displayed in response to selection of the first GUI element, wherein the second GUI element comprises a plurality response times, and wherein selecting one of the plurality of response times causes the calendar file to set the deadline in accordance with the selected response time.

13. The computing device of claim 11, wherein the deadline set by the calendar file is based on detected content within the body section of the GUI.

14. The computing device of claim 11, the GUI further comprising a header section, wherein the header section is automatically added to the body section of the draft email based on the selection of the first GUI element.

15. The computing device of claim 11, wherein each of the first and second recipient GUI elements can be selected independently of the other.

16. The GUI of claim 1, wherein the first GUI element is embedded within the body section of the draft email.

17. The non-transitory, computer-readable medium of claim 6, wherein the first GUI element is embedded within the body section of the draft email.

18. The computing device of claim 11, wherein the first GUI element is embedded within the body section of the draft email.

19. The GUI of claim 1, wherein the detected content comprises at least one non-text element.

20. The non-transitory, computer-readable medium of claim 6, wherein the deadline set by the calendar file is based on at least one non-text element detected within the body section of the GUI.

* * * * *